US009054776B2

(12) United States Patent
Tobo et al.

(10) Patent No.: US 9,054,776 B2
(45) Date of Patent: Jun. 9, 2015

(54) SIGNAL TRANSMISSION AND RECEPTION SYSTEM, INSTALLATION METHOD OF THE SYSTEM, AND PLANT APPLIED WITH THE SYSTEM

(71) Applicant: KABUSHIKI KAISHA TOSHIBA, Tokyo (JP)

(72) Inventors: Masayuki Tobo, Kawasaki (JP); Kenichi Mukoyama, Yokohama (JP); Eiichi Ookuma, Matsudo (JP); Mamoru Fukui, Yokohama (JP); Hiroki Yabu, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 215 days.

(21) Appl. No.: 13/771,669

(22) Filed: Feb. 20, 2013

(65) Prior Publication Data

US 2013/0217321 A1     Aug. 22, 2013

(30) Foreign Application Priority Data

Feb. 21, 2012   (JP) .................................. 2012-034914

(51) Int. Cl.
*H04B 7/00* (2006.01)
*H04B 7/24* (2006.01)
*G05B 19/418* (2006.01)

(52) U.S. Cl.
CPC .............. *H04B 7/24* (2013.01); *G05B 19/4183* (2013.01)

(58) Field of Classification Search
USPC ............. 455/41.2, 500, 66.1, 67.11; 370/328, 370/339; 340/500, 539.1; 248/49, 58, 65; 700/286
See application file for complete search history.

(56) References Cited

U.S. PATENT DOCUMENTS

| | | | |
|---|---|---|---|
| 7,019,638 B1* | 3/2006 | Wallace | 340/531 |
| 7,047,114 B1* | 5/2006 | Rogers | 701/21 |
| 2003/0168241 A1* | 9/2003 | Nelson et al. | 174/106 R |
| 2004/0075566 A1* | 4/2004 | Stepanik et al. | 340/632 |
| 2007/0178742 A1* | 8/2007 | Shigemi et al. | 439/394 |
| 2009/0010203 A1* | 1/2009 | Pratt et al. | 370/328 |
| 2009/0126989 A1* | 5/2009 | Ford et al. | 174/491 |
| 2010/0126951 A1* | 5/2010 | Winn et al. | 211/133.5 |
| 2010/0230551 A1* | 9/2010 | Kellerman | 248/58 |
| 2011/0082597 A1* | 4/2011 | Meagher | 700/291 |
| 2012/0049013 A1* | 3/2012 | Klein | 248/74.1 |

FOREIGN PATENT DOCUMENTS

| | | |
|---|---|---|
| JP | 62-243002 A | 10/1987 |
| JP | 07-245834 A | 9/1995 |
| JP | 2010-015381 A | 1/2010 |

OTHER PUBLICATIONS

Office Action issued Apr. 22, 2014 in Japanese Patent Application No. 2012-034914.

* cited by examiner

*Primary Examiner* — Nguyen Vo
(74) *Attorney, Agent, or Firm* — Oblon, McClelland, Maier & Neustadt, L.L.P.

(57) ABSTRACT

A signal transmission and reception system includes a transmitter adapted to transmit a signal by radio, and a receiver adapted to wirelessly receive the signal from the transmitter and transmit the signal to a monitoring and control device of a plant through a transmission cable connecting the receiver to the monitoring and control device, wherein the transmitter and the receiver are provided in the plant, and wherein the receiver is attached to a cable tray used to lay a cable other than the transmission cable.

16 Claims, 4 Drawing Sheets

SIGNAL TRANSMISSION AND RECEPTION SYSTEM, INSTALLATION METHOD OF THE SYSTEM, AND PLANT APPLIED WITH THE SYSTEM

BACKGROUND OF THE INVENTION

1. Field of the Invention

Embodiments of the present invention relate to a signal transmission and reception system, an installation method of the signal transmission and reception system, and a plant applied with the signal transmission and reception system.

2. Description of the Related Art

In an industrial plant and a power generation plant (hereinafter, simply referred to as "plant"), many instruments, sensors, or the likes (which will be hereinafter referred to as "sensors") are installed for monitoring and control of the plant. For example, a large-scale plant includes several hundreds of sensors. In above-mentioned plant, signals generated by the sensors are inputted into a monitoring and control device via laid cables. The monitoring and control device uses the signals received from the sensors to monitor and control the plant.

In recent years, from the viewpoint of economic advantage, a technique for transmitting and receiving the signals by "radio" has been proposed in order to reduce and streamline the cables.

A transmitter receives the signal generated by the sensor (or instrument), and transmits the signal after converting the signal into a radio signal. Several hundreds of the transmitters are required according to the number of the sensors, and hence the transmitter needs to be low cost and to be able to be operated by a battery having small capacity. Therefore, the power of the radio signal transmitted from the transmitter is relatively low.

Further, a receiver (antenna) for receiving the signal needs to be installed relatively in the vicinity of the transmitter. This limitation on the distance provides consistency with the radio wave regulation law or a security benefit of preventing the leakage of radio wave to the outside of the plant.

Conventionally, for example, in Patent Document 1 (Japanese Patent Laid-Open No. 2010-124027), a signal transmission and reception technique utilizing a short-distance radio network is proposed.

The sensors are attached in a site area that is a site environment in which facilities or devices of a plant are most intensively arranged. In the site area, facilities or devices, such as a pump, a fan, a turbine, and a valve, and pipes are arranged in the plant. To put it briefly, each of the sensors (and transmitters) is installed in an area surrounded by many obstacles, such as facilities or devices, arranged in the plant.

Therefore, in the case where a short-distance radio network is applied, these obstacles are located between the transmitter and the receiver so as to hinder the transmission of the signal, and thereby cause trouble in transmission and reception of the signal. Further, in the short-distance radio network, the power of the radio signal is low, and hence it cannot be expected that the reflection wave generated by the radio signal being reflected by the obstacles is received by the receiver. This makes the above-described problem more serious.

In the technique proposed in Patent Document 1, in the case where the other facilities or devices around the transmitter and the receiver become obstacles of radio waves, a radio sensor node (transmitter) is reinstalled in a place from which a radio repeater (receiver) can be seen. The technique proposed in Patent Document 1 is effective as a measure against the above-described problem in the case where the number of instruments or sensors is relatively small. However, in the case where several hundreds of instruments or sensors are provided, the technique is not necessarily realistic. For example, it is not easy to reinstall many transmitters and receivers at places where each of the transmitters is within line of sight of one or more of the receivers.

SUMMARY OF THE INVENTION

The present invention has been made in view of the above-described circumstances. An object of the present invention is to provide a signal transmission and reception system configured to be able to suitably transmit and receive a radio signal in a plant, and to provide an installation method of the system, and a plant applied with the system.

An embodiment of the signal transmission and reception system according to the present invention provided for solving the problems described above includes: a transmitter that transmits a signal by radio; and a receiver that wirelessly receives the signal from the transmitter and transmits the signal to a monitoring and control device of a plant through a transmission cable connecting the receiver to the monitoring and control device, wherein the transmitter and the receiver are installed in the plant, and wherein the receiver is attached to a cable tray provided in the plant.

Further, an embodiment of a plant (applied with the signal transmission and reception system) according to the present invention provided for solving the problems described above includes: a device electrically-connected to a power source through a power supply cable laid on a cable tray and driven by a power supply supplied from the power source; a transmitter that transmits a signal by radio; and a receiver that wirelessly receives the signal from the transmitter, transmits the signal to a monitoring and control device of the plant through a transmission cable connecting the receiver to the monitoring and control device, and is attached to the cable tray.

Furthermore, an embodiment of an installation method of a signal transmission and reception system according to the present invention provided for solving the problems described above includes: installing, in a plant including a cable tray and a device driven by a power supply, a transmitter that transmits a signal by radio; installing, on the cable tray, a receiver that wirelessly receives the signal from the transmitter and transmits the signal to a monitoring and control device of the plant through a transmission cable connecting the receiver to the monitoring and control device; and connecting the receiver to the monitoring and control device by the transmission cable and laying the transmission cable on the cable tray.

When the signal transmission and reception system, the plant applied with the system, and the installation method thereof according to the embodiments of the present invention is adapted, a suitable performance of a transmission and reception of radio signals in the plant can be achieved.

DETAILED DESCRIPTION OF THE PREFERRED EMBODIMENTS

Hereunder, embodiments of the present invention will be described with reference to the accompanying drawings. The embodiments of the present invention can be applied to various plants, such as a power generation plant, including a thermal power generation plant, and a nuclear power generation plant, and an industrial plant, such as a steel plant, a chemical plant, a food plant, and a pharmaceutical plant, and can be applied as a signal transmission and reception system installed in the plants.

[First Embodiment]

Figure 1:
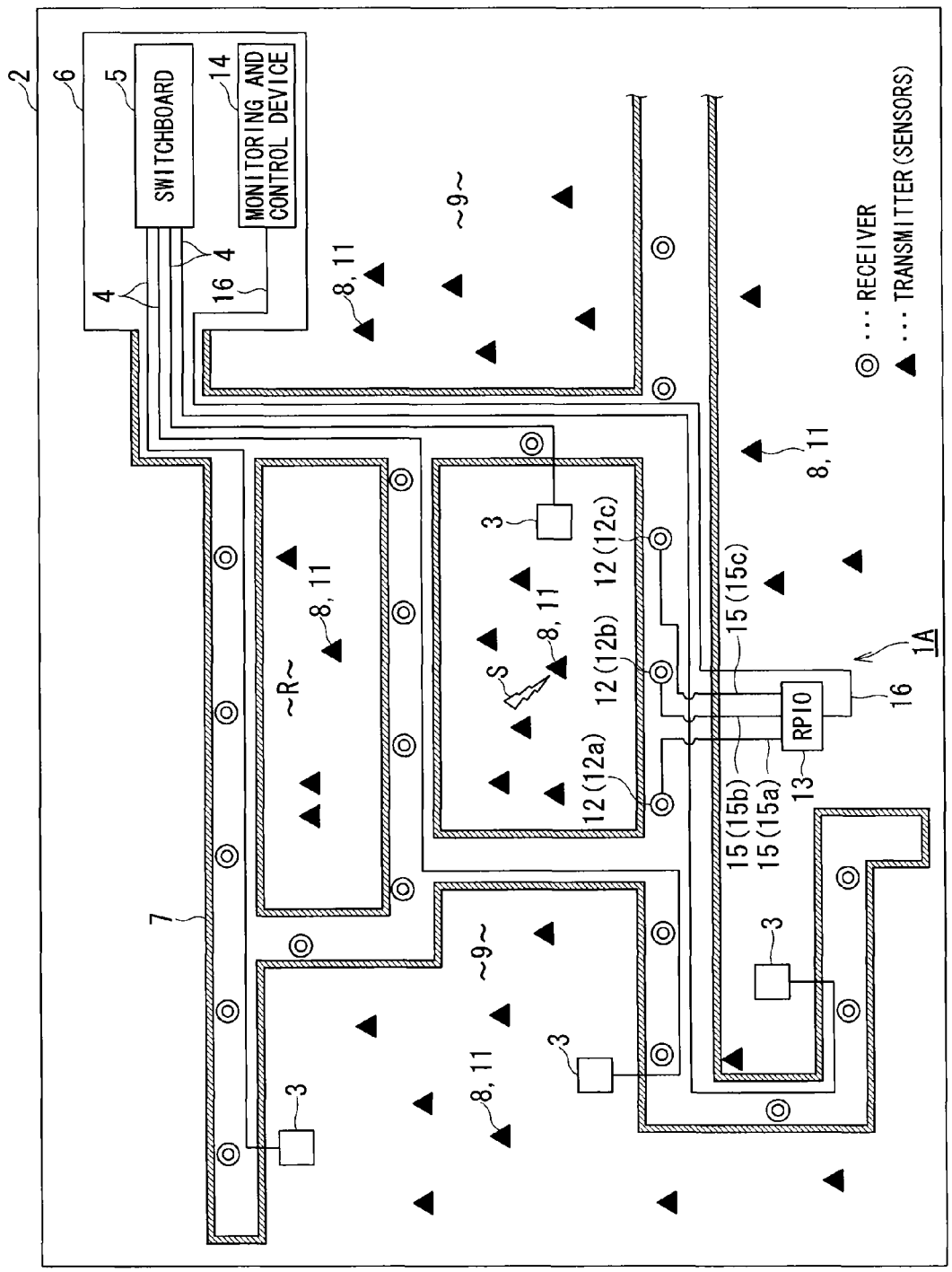
FIG. 1 is a configuration diagram schematically illustrating a first embodiment of a signal transmission and reception system and a plant which is applied with the system, according to the present invention.

FIG. 1 is a configuration diagram schematically illustrating a first embodiment of a signal transmission and reception system and a plant which is applied with the system, according to the present invention. It is noted that FIG. 1 is a plain view illustrating a signal transmission and reception system 1A as an example of the first embodiment of the signal transmission and reception system according to the present invention and a plant 2 which is applied with the signal transmission and reception system 1A seen from the ceiling side of the plant 2.

The plant 2 includes electrically-operated (electrically-driven) devices such as electric motors 3 (power facilities) for operating (driving) pumps or valves, electrically-operated valves, or the likes. Herein, the electrically-operated devices are is that a device driven by a power supply supplied from a power source. Further, the electrically-operated valve includes all kinds of valves which are operated by a driving force generated by electrical power. For example, the electrically-operated valve includes a solenoid valve, a motor-operated valve, a valve operated by the driving force generated from a device to which a voltage is applied, such as a piezoelectric element or the likes. A control valve is a valve configured to be possible to control a flow rate or a pressure, such as the motor-operated valve or the likes. A number of electric motors 3 are installed in the plant 2. The electric motors 3 are electrically-connected to a switchboard 5 as a power source by power supply cables 4. The electric motor 3 is driven by a power supply supplied from the switchboard 5 through the power supply cable 4. The switchboard 5 is arranged in a central control room 6.

The power supply cable 4 is laid along a cable tray 7. The cable tray 7 is hung from the ceiling of the plant 2 and is arranged in the vicinity of the ceiling of the plant 2, almost the whole area thereof, according to the arrangement relationship between the electric motors 3 and the switchboard 5, and the relationship between the electric motor 3 and the surrounding structures of the electric motor 3. It is noted that the cable tray 7 corresponds to a cable tray on which cables other than a transmission cable are laid. That is, the cable tray 7 is a cable tray as a place for laying the power supply cable 4 through which the switchboard 5 as the power source is electrically-connected to the electric motor 3 as the electrically-operated device driven by the power supply supplied from the switchboard 5.

The plant 2 includes a plurality of sensing devices such as instruments, sensors 8, or the likes. It is noted that in accompanying drawings (more specifically, FIGS. 1-3), sensors 8 are illustrated as examples of the sensing devices. That is, in an implementation phase, a part of the sensors 8 illustrated in drawings may be substituted with the instrument or the like. The sensors 8 measure respective process amounts to be monitored and controlled in the plant 2. For example, the sensor 8 is a transmitter which measures a physical quantity such as a pressure, a flow rate, a temperature or the likes, or a thermocouple. The sensors 8 are arranged in a site area 9 in the plant 2. Herein, the site area 9 is an area in which facilities or devices such as a pump, a fan, a turbine, a valve or the likes, or pipes are arranged. Especially, main facilities or devices installed in the plant 2 are concentratedly and closely arranged in the site area 9.

Figure 2:
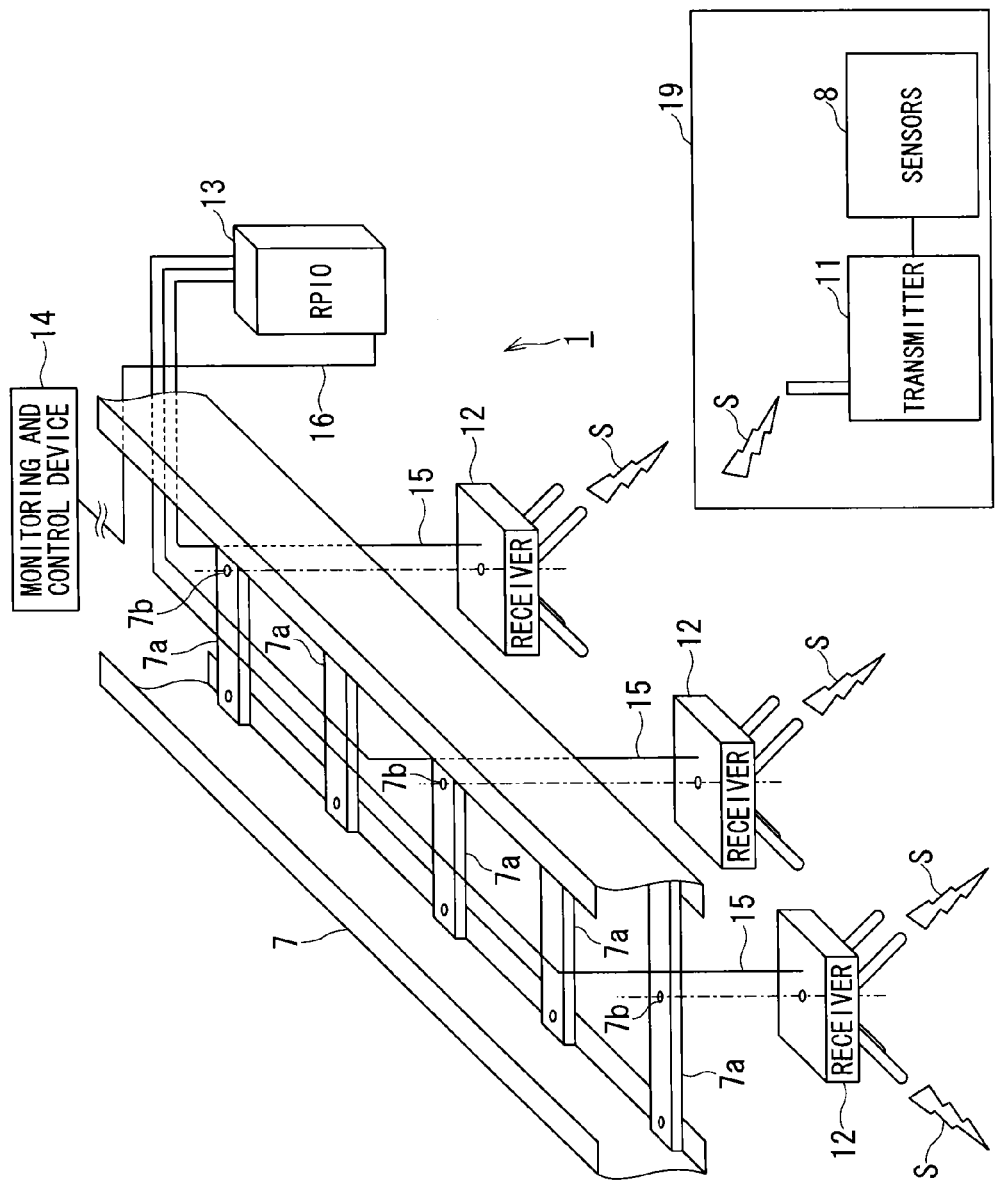
FIG. 2 is a configuration diagram representing an example of arrangement of devices included in the signal transmission and reception system and associated with a (general-purpose) cable tray.

The signal transmission and reception system 1A is arranged in the plant 2. The signal transmission and reception system 1A includes a transmitter 11 that transmits a signal by radio, a receiver 12 that wirelessly receives the signal from the transmitter 11 and transmits the signal to a monitoring and control device 14 of the plant 2 through (via) the transmission cable connecting the receiver 12 to the monitoring and control device 14, and a remote process input and output device (generally, since which is referred as "remote PI/O" or "RPIO", which will be hereinafter referred to as "RPIO") 13 as a relaying device, that relays signals transmitted and received between the monitoring and control device 14 and the receiver 12. Further, the transmitter 11 and the receiver 12 are installed in the plant 2. The receiver 12 is attached to the cable tray 7 provided in the plant 2. Herein, each of reference numerals 15 (which includes 15a, 15b and 15c) and 16 is an example of the transmission cable connecting the receiver 12 to the monitoring and control device 14. More specifically, reference numeral 15 is a metal cable connecting the receiver 12 to the RPIO 13 that relays signals transmitted and received between the monitoring and control device 14 and the receiver 12. Further, reference numeral 16 is an optical cable connecting the RPIO 13 to the monitoring and control device 14. It is noted that the signal transmission and reception system 1A illustrated in FIGS. 1 and 2 is merely typical configuration of the signal transmission and reception system 1A. That is, the number and arrangement of each components of the signal transmission and reception system 1A are not limited to those illustrated in FIGS. 1 and 2.

The transmitter 11 transmits the signal detected by the sensing device such as sensors 8 that detects and measures a physical quantity (process amounts) representing a state of the plant 2 to the receiver 12. The transmitters 11 (illustrated as a triangle in FIG. 1) and the receiver 12 (illustrated as a double circle in FIG. 1) perform communication with each other by using ZigBee (registered trademark), Bluetooth (registered trademark), or the like, which are standards of short-distance radio network (wireless network). It is preferred that a plurality of the transmitters 11 and a plurality of the receivers 12 are configured so as to be able to communicate with each other (perform n-to-n communication; n is arbitrary positive integer). Thereby, even in the case where other structures are arranged around the transmitter 11, any of the plurality of receivers 12, which are in a receivable state of a radio signal (receivers 12 from which the transmitter 11 can be seen), can receive the radio signal from the transmitter 11.

Herein, the "short-distance radio network" described in the first and second embodiments is, for example, a network having a communication distance (distance range) of about 15 m (meters). The communication distance is suitably set according to the kind or scale of the plant 2, or the radio wave regulation law.

The transmitter 11 converts a signal generated by the sensor 8 into a radio signal S, and then transmits the radio signal S to the receiver 12 by radio. The transmitter 11 is connected to the sensor 8 by a cable so as to be integrated with each other. The transmitter 11 and the sensor 8 are accommodated in an instrumentation rack 19, and are arranged at a predetermined position in the plant 2 (see FIG. 2). The transmitters 11 are provided according to the number of sensors 8 (for example, several hundreds). It is noted that the transmitter 11 may be incorporated in the sensor 8. Meanwhile, as a radio frequency identification (RFID) tag attached with a sensor or the likes, the sensor 8 may be incorporated in the transmitter 11.

The receiver 12 receives the radio signal S transmitted from the transmitter 11, and converts the signal S into a transmission signal. Each of the receivers 12 is connected to the RPIO 13 through the metal cable 15 as the transmission cable. The receiver 12 wiredly (does not wirelessly) transmits the transmission signal to the RPIO 13 via the metal cable 15.

The RPIO 13 is connected to the monitoring and control device 14 via the optical cable 16 as the transmission cable. The RPIO 13 transmits the transmission signal received from each of the receivers 12 to the monitoring and control device 14 via the optical cable 16. The short-distance radio network is used between the transmitter 11 and the receiver 12. Under above-mentioned circumstance, in the case where the monitoring and control device 14 is located far away from the receiver 12, the radio signal S cannot be directly transmitted to the monitoring and control device 14. In view of resolving above-mentioned inconvenience, the RPIO 13 functions as a relaying device which relays the transmission and reception of signals between each of the receivers 12 and the monitoring and control device 14. Accordingly, the signal transmission and reception system 1A including the RPIO 13 can directly transmit the radio signal S from the receiver 12 to the monitoring and control device 14 even if the monitoring and control device 14 is located far away from the receiver 12.

Figure 4:
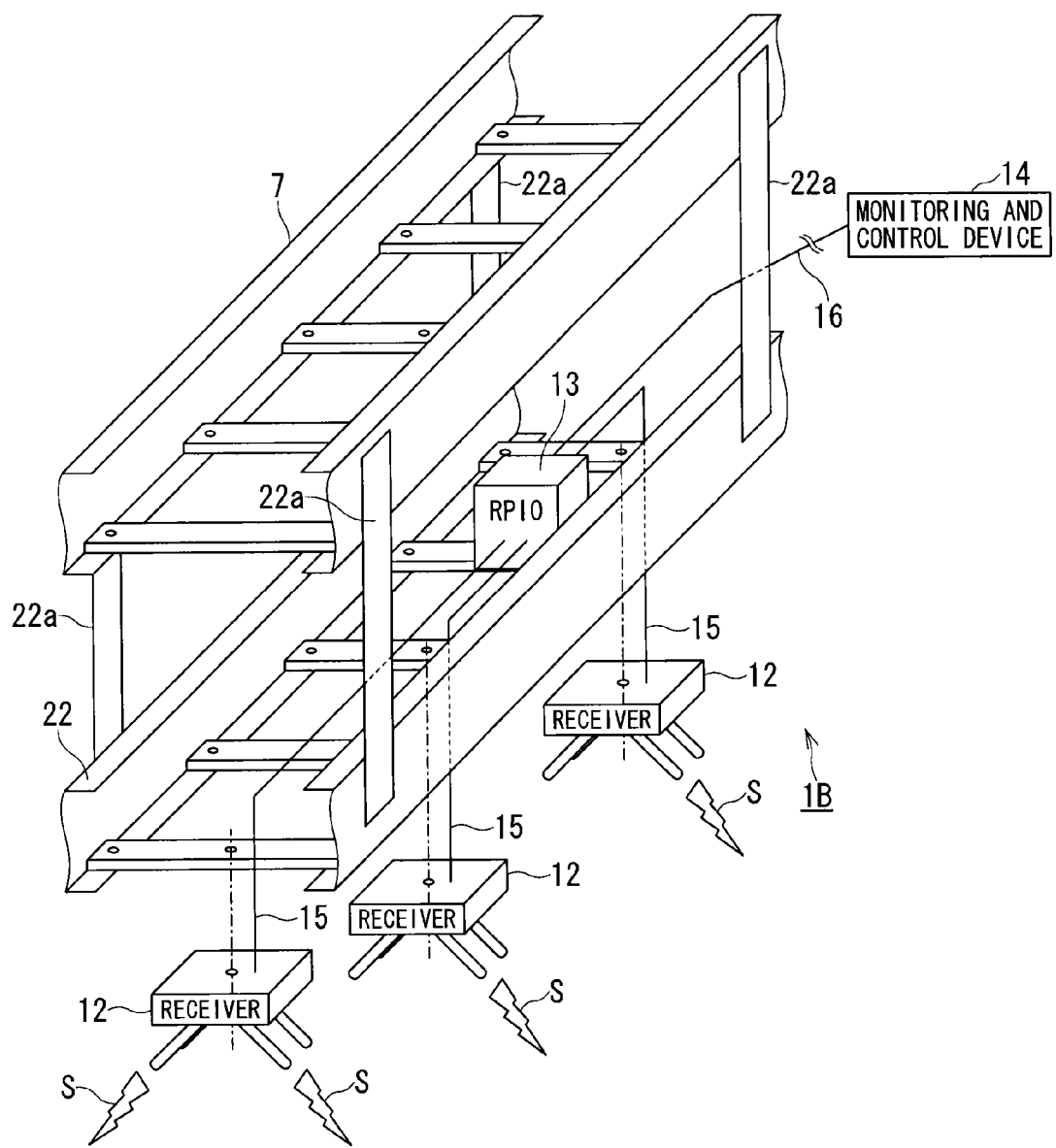
FIG. 4 is a configuration diagram schematically illustrating a second embodiment of a signal transmission and reception system and a plant which is applied with the system, according to the present invention, and is particularly representing an example of arrangement of devices included in the signal transmission and reception system and associated with a dedicated cable tray (which is not general-purpose cable tray).

A plurality of the remote process I/O devices 13 are installed in the plant 2. The metal cable 15 connected to the receiver 12 is connected to the RPIO 13 located in the vicinity of the receiver 12. Namely, one of the remote process input and output devices 13 installed in the plant 2 is illustrated in FIGS. 1, 2 and 4 and the other remote process input and output devices 13 are abbreviated (not illustrated). Further, for convenience of explanation, while FIG. 1 illustrates a case where three metal cables 15a, 15b and 15c respectively connected to three or more receivers 12 are collected into one optical cable 16, in an implementation phase, three or more metal cables 15 (for example, ten cables) may be collected into one optical cable 16. If three or more metal cables 15 are collected into one optical cable 16, the advantage of reducing the number of cables can be more remarkably obtained. However, with the increase in the number of the metal cables 15 which are collected in the RPIO 13, the distance of the metal cables 15 for connecting the receivers 12 to the RPIO 13 is increased. In light of above-mentioned circumstance, the number of transmission cables 15 collected in the RPIO 13 needs to be suitably balanced with the distance of the metal cables 15.

Namely, the RPIO 13 may be omitted so that the receivers 12a, 12b and 12c are directly connected to the monitoring and control device 14 through the three metal cables 15a, 15b and 15c, respectively. Since the monitoring and control device 14 (central control room 6) is usually located in a place about 200 m to 400 m away from the receivers 12, the advantage of streamlining the cables (the advantage of using radio transmission) may be reduced in case where each of the receivers 12 is directly connected to the monitoring and control device 14.

In the plant 2, the monitoring and control device 14 is arranged in the central control room 6, and performs monitoring and control of the plant 2 by using the received transmission signals (detection values of the sensors 8).

Next, an example of arrangement (installation) of the signal transmission and reception system 1A in the plant 2 will be specifically described.

FIG. 2 is a configuration diagram representing an example of arrangement of devices included in the signal transmission and reception system 1A and associated with the cable tray 7. Incidentally, in FIG. 2, the power supply cables 4 laid on the cable tray 7 are abbreviated (not illustrated).

As illustrated FIG. 2, the cable tray 7 includes support beams 7a for supporting the power supply cable 4. The support beams 7a are arranged at predetermined intervals (for example, about 3 m), and form the bottom portion of the cable tray 7. The support beam 7a has a mounting hole 7b for attachment of the receiver 12. The receiver 12 is attached (fixed) at the lower part of the cable tray 7 by means of a fastener such as a screw or a bolt and a not, or the likes. The receivers 12 are evenly attached at predetermined intervals (for example, 6 m) by being attached to the support beams 7a (for example, every other support beam 7a). Further, in the first embodiment, the RPIO 13 is installed on a floor surface of the plant 2 or on a support structure (not illustrated) in the vicinity of the receiver 12. The installation interval of the receiver 12 is set to a value corresponding to the performances of the receiver 12 (the receivable distance range, the number of transmitters 11 communicable with the receiver, or the likes) and corresponding to the unit cost of the receiver 12.

The metal cable 15 which connects the RPIO 13 to the receiver 12 is laid on the cable tray 7. The optical cable 16 which connects the RPIO 13 to the monitoring and control device 14 is laid on the cable tray 7 similarly to the metal cable 15. That is, the metal cable 15 and the optical cable 16 are laid along the cable tray 7 provided for the power supply cable 4 and hence the transmission cable (corresponding to the metal cable 15 and the optical cable 16) is also laid on the cable tray 7.

Figure 3:
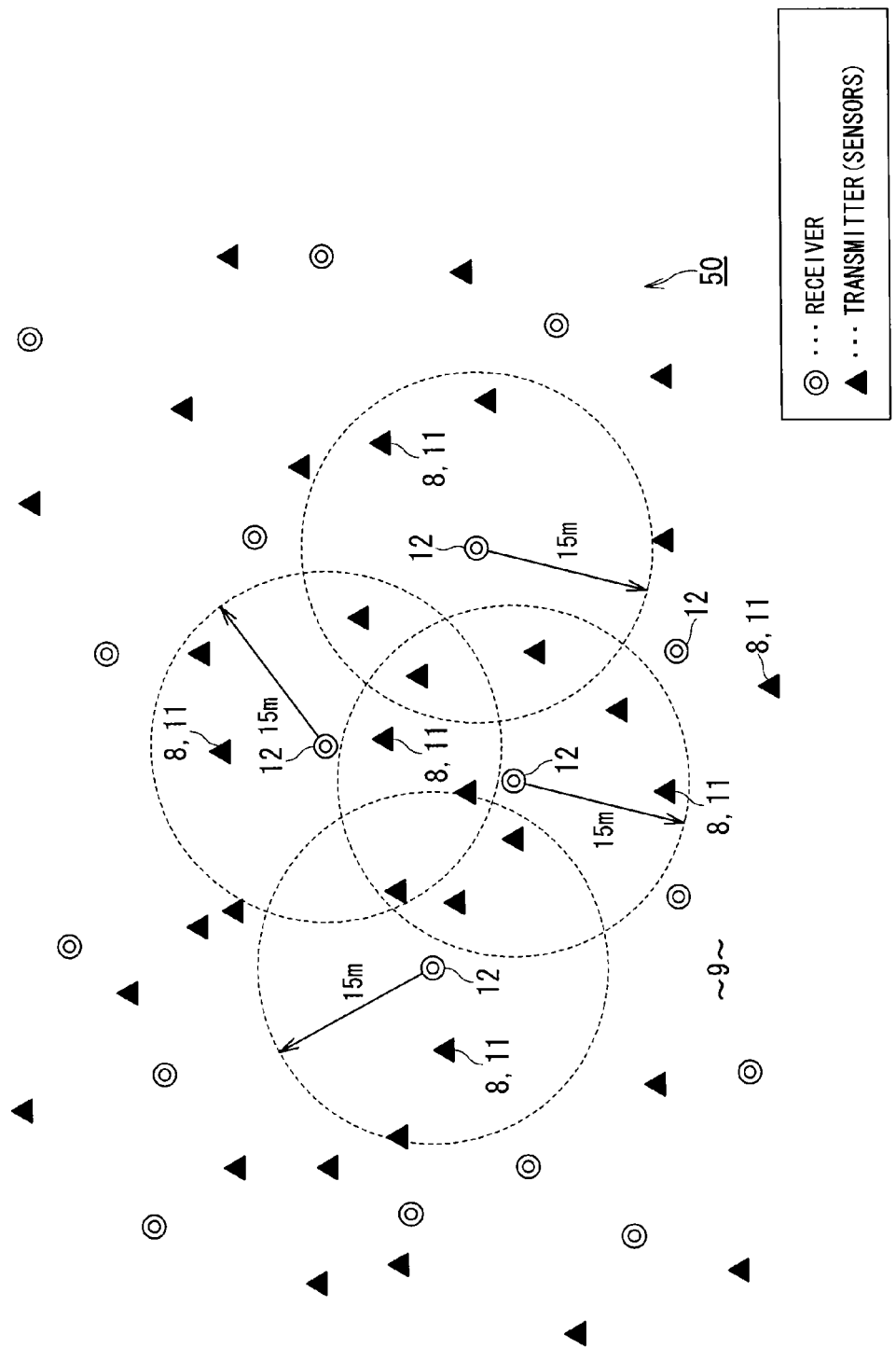
FIG. 3 is a schematic diagram illustrating a comparison example of a signal transmission and reception system.

Herein, FIG. 3 is a schematic diagram of a signal transmission and reception system 20 as a comparison example.

In the signal transmission and reception system 20 as the comparison example, radio signals are transmitted and received between the transmitters 11 and the receivers 12 in an n-to-n relationship. The transmitters 11 and the receivers 12 are supported, for example, on floor surface of the plant 2 or on supporting frames.

The transmitter 11 transmits a radio signal to an unspecified number of receivers 12. Meanwhile, the receiver 12 receives the radio signal transmitted from the transmitter 11 located at a position within the radio signal communication distance (distance range). For example, in case where the radio signal communication distance (distance range) is 15 m, the receiver 12 receives the radio signal transmitted from the transmitter 11 located at a position within 15 m. In this case, the receiver 12 which can receive the radio signal is any of the receivers 12 located at positions which are not affected by the surrounding structures and which are located within the radio signal communication distance from the transmitter 11.

The communication distance of the short-distance radio network is limited by the radio wave regulation law and the security measure for preventing the radio wave leakage to the outside of the plant. Thus, when the receivers 12 and the transmitters 11 are arranged in the plant 2, it is necessary to perform work of planning the arrangement of the receivers 12 by checking the positional relationship between the sensors 8 and the obstacles around the sensors 8 while setting the positions of the receivers 12 within the communication distance range (in this case, 15 m). Works such as planning the arrangement of the receivers 12 and the likes become "complicated" design work.

Further, even if the arrangement position of the receiver 12 can be determined by checking narrow installation spaces in the site area 9, the spaces determined as spaces for installing the receiver 12 may be occupied as spaces for installing the other facilities or devices installed in the site area 9. Furthermore, even if the spaces for installing the receiver 12 can be secured, a supporting frame for supporting the receiver 12 is necessary for actually installing the receiver 12. In the site area 9 where the facility or devices are concentratedly and closely arranged, it is not easy to further install the supporting frame.

In the signal transmission and reception system 20 as the comparison example, if the technique of the radio transmission is used, amount of the transmission cables can be reduced. On the other hand, using the radio transmission leads to a disadvantage that the workload for suitably installing the receivers 12 is increased. Herein, the workload for suitably installing the receivers 12 is, for example, the workload for planning the arrangement of the receivers 12, for securing installation spaces of the receivers 12, for installing the receivers 12, and so on. In view of above-mentioned circumstance, in case where the technique of the radio transmission is used in the signal transmission and reception system 20, unless the disadvantage can be significantly reduced or eliminated, the advantage of using the radio transmission is significantly reduced and/or the cost is increased.

Meanwhile, in the signal transmission and reception system 1A, i.e., the first embodiment of the signal transmission and reception system according to the present invention, the receiver 12 is installed on the cable tray 7. The cable tray 7 is provided to lay the power supply cable 4 for supplying power to electrically-operated (electrically-driven) devices such as the electric motors 3. That is, the cable tray 7 is provided for laying a cable (which corresponds to the power supply cable 4) other than the transmission cable (which corresponds to the metal cable 15 and the optical cable 16). The electric motor 3 is known as a device which is generally installed in the plant 2. Further, even in the case where the "radio transmission" is used in the plant 2, it is actually impossible to transmit, by "radio", the power for driving the electric motors 3. Therefore, the cable tray 7 is almost installed in the plant 2.

The signal transmission and reception system 1A described in the first embodiment can suitably transmit and receive radio signals by using the cable tray 7.

Specifically, in view of the narrow space in the site area 9, the cable tray 7 is hung in places in the vicinity of the ceiling of the plant 2. The places where the cable tray 7 is hung, in the vicinity of the ceiling of the plant 2 can be relatively easily found. The receiver 12 installed on the cable tray 7 is also installed in a relatively high place from the floor surface. Thereby, the signal transmission and reception system 1A can improve the situation in which the obstacles exist between the receivers 12 and transmitters 11. Further, according to the signal transmission and reception system 1A, since the receiver 12 is installed on the cable tray 7, it is possible to eliminate the adverse effect such as an interruption of the radio signal transmission, caused by a maintenance personnel walking around in the plant 2 for maintenance work and patrol inspection or the likes.

Further, in the signal transmission and reception system 1A, since the cable tray 7 is used as the space for installing the receiver 12, the installation work of the receivers 12 can be performed together with the installation work of the cable tray 7. Thereby, in the signal transmission and reception system 1A, the design work and the cost required to install the receivers 12 can be significantly reduced.

Specifically, in the plant 2 as general plant, many electric motors 3 are widely distributed and arranged in the site area 9. The cable tray 7 is installed so as to suitably cover the whole site area 9 in correspondence with the number and positions of the electric motors 3.

The receivers 12 are installed at respective positions of the cable tray 7, so that the receivers 12 are widely distributed and arranged in the site area 9. Therefore, in the signal transmission and reception system 1A as above-mentioned, the receiver 12 can be arranged within the communication distance range (for example, 15 m) of the short-distance radio network used for each of the several hundreds of transmitters 11 widely distributed in the site area 9.

As described above, in the signal transmission and reception system 20, the work of planning the arrangement of the transmitters 11 and the receivers 12 so that no obstacle exists between the transmitter 11 and the receiver 12 becomes complicated design work. On the other hand, in the signal transmission and reception system 1A, the receivers 12 are provided at predetermined intervals (for example, every 6 m) by using the support beams 7a of the cable tray 7. According to the signal transmission and reception system 1A, it is possible to install the receivers 12 at predetermined intervals without consideration for the detailed arrangement positions of the sensors 8 and obstacles. That is, in the signal transmission and reception system 1A, the receivers 12 are only attached to the support beams 7a provided at predetermined intervals, an installation position of the receivers 12 can be automatically and suitably determined, and hence the design burden (workload) can be significantly reduced.

Incidentally, in terms of cost of the signal transmission and reception system 1A, it is preferred to use low cost receivers 12 by which a short-distance radio network can be realized. Further, in terms of technical aspects of the signal transmission and reception system 1A, it is preferred that the receiver 12 and the transmitter 11 are arranged within the communication distance range (within the communicable distance).

In terms of technical aspects of the signal transmission and reception system 1A, a plurality of the receivers 12 can be installed within the communication distance range (within 15 m) from the transmitter 11 by using the cable tray 7 covering the plant 2. In view of above-mentioned circumstance, even if the radio signal directed to any of the receivers 12 is disturbed by an obstacle, it is extremely hard to expect that the radio signals directed to all the receivers 12 within the communication distance range are disturbed at the same time.

In particular, as illustrated in FIG. 1, in many cases, the cable tray 7 is formed in an annular shape, and installed in the plant 2 in the annular shape. In the signal transmission and reception system 1A, if the receivers 12 are arranged in the annular shape along with the cable tray 7 which is formed in the annular shape, the receivers 12 can be arranged so as to surround, from the entire periphery of the annular cable tray 7, the transmitters 11 (for example, the transmitters 11 arranged in the area "R" illustrated in FIG. 1) which are arranged on the inner side of the annular cable tray 7 in case where the transmitters 11 are seen from the side of the ceiling. According to a positional relation between the transmitters 11 and the receivers 12 installed in the signal transmission and reception system 1A, as described above, the signal transmission and reception system 1A can actually prevent a disadvantage such that communication between the transmitter 11 and all the receivers 12 being communicable with the transmitter 11 is disturbed at the same time.

On the other hand, in the signal transmission and reception system 20 as the comparison example illustrated in FIG. 3, even if the receivers 12 are arranged in a predetermined space (area) without consideration of the sensors 8 and obstacles, the same operation and effect as those of the signal transmission and reception system 1A cannot be obtained. That is, in the signal transmission and reception system 20, it is meaningless to arrange the receivers 12 at random in a predetermined space in the site area 9 (in a non-homogeneous environment) in which facilities or devices are concentratedly and closely arranged in the plant 2.

Specifically, in the signal transmission and reception system 1A, the receivers 12 can be installed at predetermined intervals mechanically (without consideration for the detailed arrangement positions of the sensors 8 and obstacles) by using the cable tray 7 including the support beams 7a installed at predetermined intervals (in other words, the cable tray 7 including a homogeneous structure). On the other hand, in the signal transmission and reception system 20 as the comparison example, if the receivers 12 are to be arranged at random, it is extremely hard to prevent the disadvantage such that communication between the transmitter 11 and all the receivers 12 being communicable with the transmitter 11 is disturbed at the same time. That is, in the signal transmission and reception system 20, if the receivers 12 are to be suitably arranged in the plant 2, a design work in accordance with the state of each space is required.

Further, in the signal transmission and reception system 1A, the cable tray 7 is used, so that the metal cable 15 and the optical cable 16 can be laid by using and via the cable tray 7.

In particular, the switchboard 5 and the monitoring and control device 14 are installed in the inside of the same central control room 6. Alternatively, the switchboard 5 is installed in an adjacent room or a downstairs room of the central control room 6, and hence is installed in the vicinity of the monitoring and control device 14 in many cases. The cable tray 7 is installed from the site area 9 to the switchboard 5, and hence the cable tray 7 is installed from the site area 9 to the monitoring and control device 14 or to the vicinity of the monitoring and control device 14.

Therefore, in the signal transmission and reception system 1A, it is possible to lay the transmission cable (the metal cable 15 and the optical cable 16) from the site area 9 to the monitoring and control device 14 by using the existing cable tray 7 without the need of a new cable route for the metal cable 15 and the optical cable 16. That is, the transmission cable is (also) laid on the cable tray 7, so that it is unnecessary to seek and determine the new cable route for laying these cables 15 and 16.

In the signal transmission and reception system 1A, attachment units such as adaptors or the likes, may be provided at the cable tray 7 or the support beams 7a at predetermined intervals so that the receivers 12 are installed at the attachment units.

There is a case where the electrically-operated valves exemplified as the electrically-operated devices, such as a solenoid valve, a motor-operated valve, a valve operated by a piezoelectric element, or the likes, are operated by the power supply supplied from the switchboards 5 and exist in the plant 2. In this case, the cable tray 7, on which the power supply cables 4 of the electrically-operated devices are laid, is installed. In case where the cable tray 7 is provided for laying the power supply cables 4, the receivers 12 may be attached to the cable tray 7 provided for laying the power supply cables 4.

Namely, the RPIO 13 as the relaying device may be arranged on the cable tray 7. In this case, the metal cable 15 and the optical cable 16 can be more suitably laid than a case where the RPIO 13 is not arranged on the cable tray 7. According to the plant 2 applied with the signal transmission and reception system 1A, i.e., the plant 2 including the device (for example the electric motor 3) electrically-connected to the switchboard 5 as the power source through the power supply cable 4 laid on the cable tray 7 and driven by the power supply supplied from the switchboard 5, the transmitter 11 that transmits the signal S by radio, and the receiver 12 that wirelessly receives the signal S from the transmitter 11, transmits the signal S to the monitoring and control device 14 of the plant 2 through the transmission cable (which corresponds to the metal cable 15 and the optical cable 16) connecting the receiver 12 to the monitoring and control device 14, and is attached to the cable tray 7, the plant 2 can achieve the same operation and effect as those of the signal transmission and reception system 1A. Further, according to the installation method of the signal transmission and reception system 1A, i.e., the installation method including: installing, in the plant 2 including the cable tray 7 and the device (for example the electric motor 3) driven by the power supply, the transmitter 11 that transmits the signal S by radio; installing, on the cable tray 7, the receiver 12 that wirelessly receives the signal S from the transmitter 11 and transmits the signal S to the monitoring and control device 14 of the plant 2 through the transmission cable (which corresponds to the metal cable 15 and the optical cable 16) connecting the receiver 12 to the monitoring and control device 14; and connecting the receiver 12 to the monitoring and control device 14 by the transmission cable and laying the transmission cable on the cable tray 7, the installation method can achieve the same operation and effect as those of the signal transmission and reception system 1A.

[Second Embodiment]

Hereunder, a second embodiment of a signal transmission and reception system, an installation method of the system, and a plant applied with the system, according to the present invention, will be described with reference to the accompanying drawings.

FIG. 4 is a configuration diagram schematically illustrating a signal transmission and reception system 1B as an example of a second embodiment of a signal transmission and reception system and a plant which is applied with the signal transmission and reception system 1B, according to the present invention, and is particularly representing an example of arrangement of devices included in the signal transmission and reception system 1B and associated with a dedicated cable tray 22. Herein, the dedicated cable tray 22 is not general-purpose cable tray such as the cable tray 7. The entire configuration of the signal transmission and reception system 1B and the plant 2 according to the second embodiment is almost the same as that illustrated in FIG. 1, and therefore is not illustrated in FIG. 4. Further, the configurations and portions, which are the same as those of the first embodiment, are denoted by the same reference numerals and characters, and the duplicating explanation thereof is omitted.

The signal transmission and reception system 1B (the second embodiment) is different from signal transmission and reception system 1A (the first embodiment) in that the dedicated cable tray 22 provided for laying the transmission cable (which corresponds to the metal cable 15 and the optical cable 16) is newly provided, and in that the RPIO 13 is provided on the dedicated cable tray 22.

For example, as illustrated FIG. 4, the dedicated cable tray 22 is attached to the lower stage of the cable tray 7 used for the power supply cable 4 connected to the electric motors 3 or the likes. The cable tray 7 (undedicated cable tray) and the dedicated cable tray 22 are attached to each other in a stacked state, and hence the cable tray 7 and the dedicated cable tray 22 are configured in a stacked state. The dedicated cable tray 22 is hung by fixtures 22a extended downward vertically from the cable tray 7. The dedicated cable tray 22 and the cable tray 7 share the same cable route, and are integrally configured. Incidentally, the upper and lower relationship between the cable tray 7 and the dedicated cable tray 22 is not limited to the relationship illustrated in FIG. 4. FIG. 4 merely illustrates an example of the upper and lower relationship between the cable tray 7 and the dedicated cable tray 22.

In the signal transmission and reception system 1B, the receivers 12 are attached to the dedicated cable tray 22. The installation method of the receivers 12 is the same as that of the signal transmission and reception system 1A (the first embodiment). Further, the RPIO 13 as the relaying device is installed (arranged) on the dedicated cable tray 22. The receivers 12 and the RPIO 13 are connected to each other by the metal cables 15 as the transmission cable. The RPIO 13 is connected to the monitoring and control device 14 by the optical cable 16 the transmission cable. The metal cable 15 and the optical cable 16, as the transmission cables are laid on the dedicated cable tray 22.

Herein, in the second embodiment as described above, the disadvantage, that the workload for suitably installing the receivers 12 is increased, as described in the first embodiment, also occurs similar to the RPIO 13. Thus, in the signal transmission and reception system 1B, the installation (arrangement) space of the RPIO 13 is secured by providing the dedicated cable tray 22 so that the RPIO 13 as the relaying device is arranged on the dedicated cable tray 22. According to the signal transmission and reception system 1B, the troublesome work in the installation of the RPIO 13 on the floor surface can be significantly reduced or eliminated.

Further, in the case where the RPIO 13 is installed on the cable tray 7, the laying of the original power supply cable 4 may become difficult. Furthermore, in this case, since the metal cable 15 is laid on the cable tray 7, the metal cable 15 may be easily-affected by electromagnetic noise generated from the power supply cable 4. Meanwhile, in the signal transmission and reception system 1B, an installation space with flexibility and more room for the RPIO 13 and the receiver 12 can be secured by providing the dedicated cable tray 22.

Further, in consideration of merely installing the RPIO 13, a less expensive and simpler rack-like or box-like structure, or a mere fixture may be provided without installation of the dedicated cable tray 22. However, in case where the RPIO 13 is installed on the rack-like structure or the likes, it may be difficult to lay the metal cable 15 and the optical cable 16 with relation to the cable tray 7. That is, in this case, for some cables 15 and 16, it may be necessary to seek and determine a new cable route for laying these cables 15 and 16. In light of circumstance described above, in the signal transmission and reception system 1B, since the dedicated cable tray 22 is newly (further) provided in addition to the signal transmission and reception system 1A, the metal cable 15 and the optical cable 16 can be more suitably laid by using the dedicated cable tray 22 than the signal transmission and reception system 1A.

Since the dedicated cable tray 22 and the cable tray 7 share the same cable route, the advantages resulted from arranging the receivers 12 on the dedicated cable tray 22 in the signal transmission and reception system 1B are similar to the advantages resulted from arranging the receivers 12 on the cable tray 7 in the signal transmission and reception system 1A (for example, the advantage that the transmitters 11 can be arranged within the communication distance range). That is, even if the receivers 12 are not arranged on the cable tray 7 but arranged on the dedicated cable tray 22, the signal transmission and reception system 1B causes advantages being substantially equal to the advantages resulted from arranging the receivers 12 on the cable tray 7 in the signal transmission and reception system 1A.

As described above, the signal transmission and reception systems 1A and 1B, the installation methods thereof, and the plants 2 applied with the signal transmission and reception systems 1A and 1B, described in the first and second embodiments, can suitably perform transmission and reception of radio signals in the plant.

It is noted that the present invention is not limited to the above-described embodiments as they are and, in an implementation phase, can be embodied in various forms other than the specific embodiments described above. Various omissions, additions, substitutions, and changes may be made without departing from the spirit and scope of the invention. These embodiments and modifications thereof are included within the sprit and scope of the invention and are included within the scope of the invention as disclosed in the claims and equivalents thereof.

What is claimed is:

1. A signal transmission and reception system comprising:
a transmitter that transmits a signal by radio; and
receivers that wirelessly receive the signal from the transmitter and transmits the signal to a monitoring and control device of a plant through a transmission cable connecting the receivers to the monitoring and control device,
wherein the transmitter and the receivers are installed in the plant, and wherein the receivers are attached to an annular cable tray for laying a cable other than the transmission cable provided in the plant and surrounding the transmitter from an entire periphery of the annular cable tray.

2. The signal transmission and reception system according to claim 1, wherein the transmission cable is laid on the annular cable tray.

3. The signal transmission and reception system according to claim 1, wherein the transmitter transmits a signal detected by a sensing device that detects and measures a physical quantity representing a state of the plant to the receivers.

4. The signal transmission and reception system according to claim 1, further comprising a relaying device that relays signals transmitted and received between the monitoring and control device and the receivers.

5. The signal transmission and reception system according to claim 4, wherein the relaying device is arranged on the cable tray.

6. The signal transmission and reception system according to claim 1, wherein the cable tray is a cable tray as a place for laying a power supply cable through which a power source is electrically-connected to a device driven by a power supply supplied from the power source.

7. The signal transmission and reception system according to claim 6, wherein the device driven by the power supply supplied from the power source is at least one of an electric motor, and an electrically-operated valve.

8. The signal transmission and reception system according to claim 1, wherein the receivers are attached to the cable tray at predetermined intervals.

9. The signal transmission and reception system according to claim 1, wherein the cable tray includes support beams arranged at predetermined intervals and wherein the receivers are attached to support beams.

10. The signal transmission and reception system according to claim 1, wherein the annular cable tray includes a cable tray for laying cable other than the transmission cable and a dedicated cable tray provided for laying the transmission cable, wherein the receivers are attached to the dedicated cable tray.

11. The signal transmission and reception system according to claim 10, wherein the dedicated cable and the cable tray are configured in a stacked state.

12. The signal transmission and reception system according to claim 10, further comprising a relaying device that relays signals transmitted and received between the monitoring and control device and each of the receivers,
wherein the relaying device is arranged on the dedicated cable tray.

13. The signal transmission and reception system according to claim 1, wherein the cable tray is hung from a ceiling of the plant and is arranged in a vicinity of the ceiling.

14. A plant comprising:
a device electrically-connected to a power source through a power supply cable laid on an annular cable tray for laying the power supply cable and driven by a power supply supplied from the power source;
a transmitter that transmits a signal by radio; and
receivers that wirelessly receiver the signal from the transmitter, transmits the signal to a monitoring and control device of the plant through a transmission cable connecting the receivers to the monitoring and control device, and is attached to the annular cable tray,
wherein the receivers surround the transmitter from an entire periphery of the annular cable tray.

15. The plant according to claim 14, wherein the transmission cable is laid on the annular cable tray.

16. An installation method of a signal transmission and reception system, comprising:
installing, in a plant including a device driven by a power supply supplied from a power source through a power supply cable and an annular cable tray for laying the power supply cable, a transmitter that transmits a signal by radio;
installing, on the annular cable tray, receivers that wirelessly receive the signal from the transmitter and transmits the signal to a monitoring and control device of the plant through a transmission cable connecting the receiver to the monitoring and control device, so as to surround the transmitter, by the receivers, from an entire periphery of the annular cable tray; and
connecting the receivers to the monitoring and control device by the transmission cable and laying the transmission cable on the annular cable tray.

* * * * *